United States Patent [19]
Nissen et al.

[11] 4,281,552
[45] Aug. 4, 1981

[54] ELECTROMAGNETIC FLOWMETER

[75] Inventors: Peter Nissen, Rosdorf; Wilfried Kiene, Hann Mundun; Eggert Appel, Dransfeld, all of Fed. Rep. of Germany

[73] Assignee: Fischer & Porter Company, Inc., Warminster, Pa.

[21] Appl. No.: 54,985

[22] Filed: Jul. 5, 1979

[30] Foreign Application Priority Data

Jul. 18, 1978 [DE] Fed. Rep. of Germany ....... 2831570

[51] Int. Cl.$^3$ ............................................... G01F 1/58
[52] U.S. Cl. ................................................. 73/861.12
[58] Field of Search ........... 73/861.12, 861.14, 861.15, 73/861.16; 335/281, 297; 336/233

[56] References Cited
U.S. PATENT DOCUMENTS 3,827,298  8/1974  Kawamata et al. ............... 73/861.12
4,186,600  5/1980  Appel et al. ...................... 73/861.12

*Primary Examiner*—Herbert Goldstein
*Attorney, Agent, or Firm*—Michael Ebert

[57] ABSTRACT

An electromagnetic flowmeter in which the fluid to be metered is conducted through a flow tube formed of nonmagnetizable metal and provided with an inner lining of electrical-insulating material. The fluid intercepts a transverse electromagnetic field established in the tube whereby the voltage induced in the fluid is transferred to a pair of electrodes disposed at diametrically-opposed positions on the tube to yield a signal indicative of flow rate. The electromagnet is constituted by at least one solid core surrounded by a coil to which a low-frequency excitation current is applied, the core having a cavity in a region therein which serves to reduce the mass of the core without, however, significantly affecting the intensity of the magnetic field produced thereby.

7 Claims, 4 Drawing Figures

ELECTROMAGNETIC FLOWMETER

BACKGROUND OF INVENTION

1. Field of Invention

This invention relates generally to an electromagnetic flowmeter in which the excitation current for the coil of the electromagnet is a low-frequency wave and in which the core of the electromagnet has a cavity therein which serves to reduce the mass of the core without, however, significantly reducing the strength of the magnetic field produced thereby.

2. Prior Art

In an electromagnetic flowmeter, the fluid whose flow rate is to be measured is conducted through a flow tube provided with a pair of diametrically-opposed electrodes, a magnetic field mutually perpendicular to the longitudinal axis of the tube and to the electrode axis being established by an electromagnet. When the fluid intersects this field, a voltage is induced therein which is transferred to the electrodes. This voltage, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. Though A-C operation is clearly advantageous in that the A-C flow induced signal may be more easily amplified, it has distinct drawbacks. The use of an alternating flux introduces unwanted in-phase and quadrature components that are unrelated to flow rate and, if untreated, give rise to inaccurate indications.

To overcome these drawbacks, the U.S. patent to Mannherz et al., U.S. Pat. No. 3,783,687, discloses an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects.

In an electromagnetic flowmeter whose excitation current is a low-frequency wave which creates a low-frequency pulsatory uni-directional field, it is known, as evidenced by German petty Pat. No. 7,721,163 to establish this field transversely in a flow tube formed of an unmagnetizable metal whose interior is lined by an electrically-insulating layer, the electromagnet for this purpose having a solid core of "soft" ferromagnetic material surrounded by an excitation coil.

With an unlaminated electromagnet core such as that disclosed in the above-identified German patent and with a low-frequency excitation current applied to the coil, the resultant eddy current effects are negligible. But in order to obtain a strong output signal indicative of flow rate, it is essential that the electromagnetic field established in the flow tube of the flowmeter encompass a large region in the longitudinal direction of the tube. This requirement dictates a massive core for the electromagnet. A core of this type adds to the bulk as well as to the cost of the flowmeter and presents problems in regard to attaching the core to the flow tube.

SUMMARY OF INVENTION

In view of the foregoing, the main object of this invention is to provide an electromagnetic flowmeter in which the core of the electromagnet has a cavity in a region therein which, because of skin effects, serves to reduce the mass of the core without, however, significantly reducing the intensity of the magnetic field produced thereby, the core structure making possible output signals of high strength.

The term "skin effect" generally has reference to the tendency of alternating-current to concentrate on the surface layer of a conductor, this effect increasing with frequency. Hence with direct current there is no skin effect, and with very high frequency currents, the current concentration is close to the surface of the conductor without regard to its diameter. "Skin depth," on the other hand, refers to the depth below the surface of a conductor at which the current density has decreased one neper due to the action of the electromagnetic field associated with the alternating-current flowing through a conductor. Obviously, therefore, the lower the frequency of the current, the greater the depth of penetration.

The concern of the present invention is with skin effect in the context of an electromagnet, this factor determining the depth to which a core is penetrated by the magnetic field created by the surrounding excitation coil.

The present invention is based upon the discovery that with an electromagnet provided with a solid core and having a low-frequency wave applied to the excitation coil, that, contrary to expectation, skin effects are sufficiently significant to give rise to a magnet field at the effective front face of the core whose strength is markedly lower in the central area of this face than in the surrounding area bordered by the edge of the core.

Thus in a core for an electromagnet in accordance with the invention, the presence of a cavity in the region therein in which the magnetic field is of low intensity as a result of skin effect does not materially affect the overall intensity of the magnetic field established by the electromagnet, but it does substantially reduce the mass of the core and thereby simplify the attachment of the core to the flow tube.

Briefly stated, these objects are attained in an electromagnetic flowmeter in which the fluid to be metered is conducted through a flow tube formed of non-magnetizable metal and provided with an electrically-insulating liner, the fluid passing through the tube intercepting a transverse magnetic field established transversely therein whereby the voltage induced in the fluid is transferred to a pair of diametrically-opposed electrodes to yield an output signal indicative of flow rate.

The field is produced by an electromagnet having a solid core of ferromagnetic material surrounded by a coil to which a low-frequency excitation current is applied, the resultant field, because of skin effect, penetrating the core to a limited extend whereby at the effective front face of the core, the field strength is markedly lower in the central area than in the area surrounding the central area. The core has a cavity formed in the central region thereof, which cavity serves to reduce the mass of the core without significantly affecting the intensity of the magnetic field produced thereby.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

First Embodiment

Figure 1:
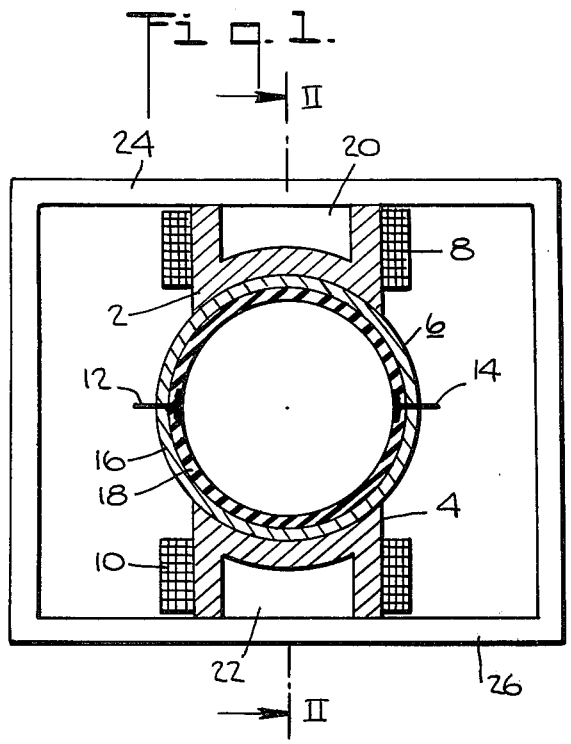
FIG. 1 is a transverse section taken through a first embodiment of an electromagnet in accordance with the invention for a flowmeter.
Figure 2:
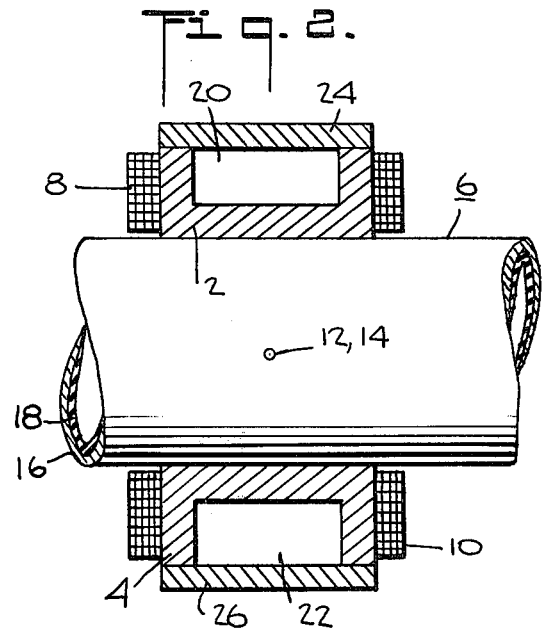
FIG. 2 is a section taken in the plane indicated by line II—II in FIG. 1.

Referring now to FIGS. 1 and 2, there is shown an electromagnetic flowmeter which includes an electromagnet system in accordance with the invention. This system is constituted by a pair of identical electromagnets including cores 2 and 4 placed on opposing sides of a flow tube, generally designated by numeral 6, through which the fluid to be metered is conducted.

Cores 2 and 4 are fabricated of non-laminated blocks of cup-shaped form, the face of each block conforming to the periphery of the flow tube. Each core cup which is open to the exterior is adapted to produce a magnetic field that extends transversely through flow tube 6, the lines of flux being mutually perpendicular to the direction of flow and to the axis passing through electrodes 12 and 14 disposed at diametrically-opposed positions on the tube. Flow tube 6 is constituted by an outer pipe 16 of non-magnetizable material and an internal layer 18 of electrical insulating material.

Wound about cores 2 and 4 are coils 8 and 10, respectively, the coils being excited by a low-frequency wave. To provide a return path for the magnetic flux produced by the pair of electromagnets, cores 2 and 4 are bridged by straps 24, 26 of ferromagnetic material, this being the usual arrangement in an electromagnetic flowmeter.

The hollows 20 and 22 of the cup-shaped cores constitute cavities which lie in a region which, had the cores been solid throughout, would be the central region thereof. Because of skin effects, this region does not materially contribute to the intensity of the magnetic field produced by the electromagnet.

Hence cavities 20 and 22, though serving to substantially reduce the mass of the cores, do not adversely affect the intensity of the field. And because the cores are less massive, it becomes easier to attach them to flow tube 6.

Second Embodiment

Figure 3:
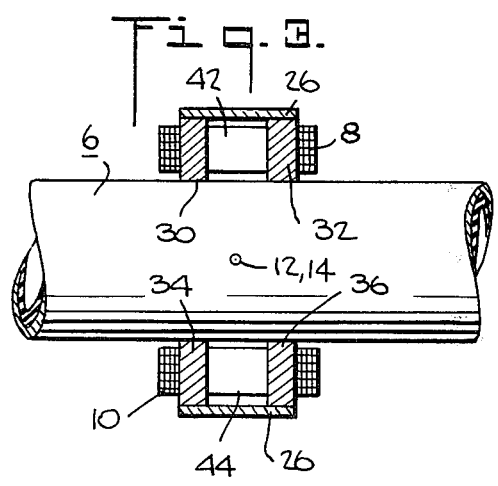
FIG. 3 is a sectional view corresponding to the section in FIG. 2 illustrating a second embodiment of the invention.

In the core arrangement shown in FIG. 3, each of the identical cores is formed by two solid blocks which are spaced apart from each other, the spacing constituting the core cavity. Thus the upper core is formed by blocks 30 and 32 surrounded by coil 8, while the lower core is formed by spaced blocks 34 and 36 surrounded by coil 10.

The space 42 between blocks 30 and 32 constitutes the central region cavity in the upper core, and the space 44 between blocks 34 and 26 constitutes the corresponding central region cavity in the lower core. A magnetic return path between the cores is provided in the same manner as in FIG. 1.

Third Embodiment

Figure 4:
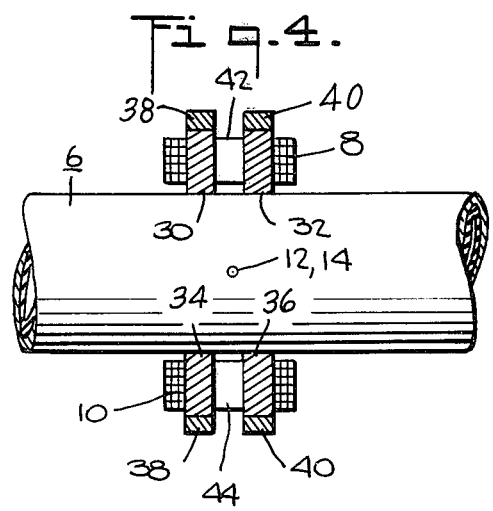
FIG. 4 is a sectional view corresponding to the section in FIG. 2, illustrating a third embodiment of the invention.

In the third embodiment shown in FIG. 4, the upper and lower cores are formed in the same manner as in the second embodiment; that is, by a first pair of spaced blocks 30 and 32, and by a second pair of spaced blocks 34 and 36.

However, instead of a return flux strap 26 as in FIG. 3 which bridges the blocks of both cores, in FIG. 4 the arrangement is such that a set of corresponding blocks 30 and 34 in the upper and lower cores are magnetically joined by a strap 38 of ferromagnetic material, and the other set of blocks 32 and 36 by a separate strap 40 of ferromagnetic material.

While there have been shown and described preferred embodiments of an electromagnetic flowmeter in accordance with the invention, it will be appreciated that many changes and modifications may be made therein without, however, departing from the essential spirit thereof.

We claim:

1. An electromagnetic flowmeter comprising:
   A. a cylindrical flow tube through which the fluid to be metered is conducted, said tube being formed of non-magnetizable metal whose interior is lined by an electrically-insulating material;
   B. a pair of electrodes disposed at diametrically-opposed positions on said tube; and
   C. means to establish a transverse magnetic field in said tube which is intercepted by the fluid conducted therethrough to induce a voltage therein which is transferred to said electrodes to yield a signal indicative of flow rate, said means including at least one core of solid ferromagnetic material surrounded by a coil to which a low-frequency excitation current is applied, said core having a front face conforming to the periphery of the tube and having a cavity therein which lies in the central region thereof in which the intensity of the magnetic field is relatively weak due to skin effects, whereby the intensity of the field produced thereby is essentially unaffected by the cavity, whereas the mass of the core is substantially reduced.

2. A flowmeter as set forth in claim 1, wherein said means is constituted by a pair of said cores attached at opposing positions to said metal tube.

3. A flowmeter as set forth in claim 2, further including a magnetic flux return-path constituted by a strap bridging the cores.

4. A flowmeter as set forth in claim 1, wherein said core is constituted by a cup-shaped block whose hollow constitutes said cavity.

5. A flowmeter as set forth in claim 1, wherein said core is constituted by a pair of spaced solid blocks, the spacing therebetween defining said cavity.

6. A flowmeter as set forth in claim 2, wherein each of said cores is constituted by a pair of spaced solid blocks, the spacing therebetween defining said cavity.

7. A flowmeter as set forth in claim 6, further including a pair of flux return-path straps, one of which interconnects one set of corresponding blocks in the upper and lower cores, and the second of which interconnects the other set of blocks.

* * * * *